(12) United States Patent
Deng et al.

(10) Patent No.: US 9,880,299 B2
(45) Date of Patent: Jan. 30, 2018

(54) TIME LABEL COMBINATION METHOD AND SYSTEM

(71) Applicant: RAYCAN TECHNOLOGY CO., LTD. (SU ZHOU), Jiangsu (CN)

(72) Inventors: Zhenzhou Deng, Jiangsu (CN); Qingguo Xie, Jiangsu (CN)

(73) Assignee: RAYCAN TECHNOLOGY CO., LTD. (SU ZHOU), Suzhou New District, Suzhou, Jiangsu (CN)

( * ) Notice: Subject to any disclaimer, the term of this patent is extended or adjusted under 35 U.S.C. 154(b) by 0 days.

(21) Appl. No.: 15/037,662

(22) PCT Filed: Dec. 25, 2013

(86) PCT No.: PCT/CN2013/090390
§ 371 (c)(1),
(2) Date: May 18, 2016

(87) PCT Pub. No.: WO2015/074313
PCT Pub. Date: May 28, 2015

(65) Prior Publication Data
US 2016/0291175 A1    Oct. 6, 2016

(30) Foreign Application Priority Data

Nov. 19, 2013 (CN) .......................... 2013 1 0583127

(51) Int. Cl.
*G01T 1/29* (2006.01)

(52) U.S. Cl.
CPC .................. *G01T 1/2985* (2013.01)

(58) Field of Classification Search
CPC ........ G01T 1/16; G01T 1/1647; G01T 1/2985
See application file for complete search history.

(56) References Cited

U.S. PATENT DOCUMENTS 8,866,654 B2 * 10/2014 Mann ........................ G01T 1/17
341/126
2003/0062482 A1    4/2003 Williams et al.
(Continued)

FOREIGN PATENT DOCUMENTS

CN          101680953 A       3/2010
CN          101903798 A      12/2010
(Continued)

OTHER PUBLICATIONS

Extended European Search Report dated Sep. 6, 2017 in corresponding EP Application No. 13897934.9.
(Continued)

*Primary Examiner* — David Porta
*Assistant Examiner* — Faye Boosalis
(74) *Attorney, Agent, or Firm* — Knobbe Martens Olson & Bear LLP (57) ABSTRACT

A time label combination method, comprising the steps: collecting data acquisition system digital measurement values and establishing a database for the measured values; identifying atomic time label quantities and shape fluctuation statistics; estimating a covariance matrix of each atomic time label; according to the least squares criterion, giving the time label combination. Also provided is a time label combination system, comprising a low-dose pre-acquisition data module, a digital identification module, a quantitative variance calculation module, and a time label combination parameter calculation module. By means of using the described time label combination method and system, system and resolution is effective increased, and the invention is particularly suitable for nuclear instrument time acquisition.

6 Claims, 6 Drawing Sheets

(56) References Cited

U.S. PATENT DOCUMENTS

| | | |
|---|---|---|
| 2006/0180776 A1 | 8/2006 | Exelmans et al. |
| 2010/0219345 A1 | 9/2010 | Franch et al. |
| 2011/0163238 A1 | 7/2011 | Teshigawara et al. |
| 2011/0210255 A1 | 9/2011 | Kim et al. |
| 2011/0301918 A1 | 12/2011 | Haselman et al. |
| 2012/0268105 A1 | 10/2012 | Mann et al. |
| 2012/0268303 A1 | 10/2012 | Burr et al. |
| 2013/0284941 A1 | 10/2013 | Chang et al. |

FOREIGN PATENT DOCUMENTS

| | | |
|---|---|---|
| CN | 102859391 A | 1/2013 |
| JP | 2009-540339 A | 11/2009 |
| JP | 2011-141139 A | 7/2011 |
| JP | 2012-225923 A | 11/2012 |
| JP | 2012-225926 A | 11/2012 |
| WO | 2007/146587 A2 | 12/2007 |
| WO | 2012/137109 A2 | 10/2012 |

OTHER PUBLICATIONS

Seifert et al., A Comprehensive Modal to Predict the Timing Resolution of SiPM-Based Scintillation Detectors: Theory and Experimental Validation, IEEE Transaction on Nuclear Science, vol. 59, No. 1, Feb. 2012.
Office Action dated Jun. 20, 2017 in corresponding JP Application No. 2016-532597.

* cited by examiner

TIME LABEL COMBINATION METHOD AND SYSTEM

The present application is the national phase of International Application No. PCT/CN2013/090390, titled "TIME LABEL COMBINATION METHOD AND SYSTEM", filed on Dec. 25, 2013, which claims the priority Chinese Patent Application No. 201310583127.6, titled "TIME LABEL COMBINATION METHOD AND SYSTEM" and filed with the Chinese State Intellectual Property Office on Nov. 19, 2013, both of which are incorporated herein by reference in entirety.

FIELD

The present disclosure relates to the fields of digital signal processing, photoelectric signal processing and nuclear detection, and particularly to a method and system for combining time labels of arrive of events.

BACKGROUND

In the field of nuclear analysis such as a positron lifetime spectrometer or a positron angle-momentum association analyzer, the field of nuclear detection such as double-coincident high-energy-particle discrimination and the field of medical imaging such as positron emission tomography (abbreviated as PET), a detector has two operating principles. That is, one operating principle is to convert, by a scintillator, a high-energy photon into a visible photon or an ultraviolet photon having low energy, and then convert, by a photoelectric device, the visible photon or the ultraviolet photon into an electrical signal; and the other operating principle is to directly convert a high-energy photon into an electrical signal by a semiconductor material such as Cadmium Zinc Telluride (abbreviated as CZT). The detector outputs the electrical signal in the two operating principles described above.

In a PET system, system performance is improved and an application scope is extended in a case of good time resolution. First, in a case that the time resolution is good enough (for example, less than 800 picoseconds), a location where positron annihilation occurs is deduced based on a time difference of the arrival of two electrical pulses, a value of the location meets the Gaussian distribution, and the full width half maximum of the distribution is less than 12 cm (corresponding to 800 picoseconds). Information on the location has a significant effect on improving a signal-to-noise ratio of an image. Secondly, the good time resolution can facilitate rejecting scattering better, and improving system noise equivalent counting. Thirdly, since the time difference has a positioning ability for a coincident event along a direction of a line of response (abbreviated as LOR), a completeness requirement for a projection data may be reduced by reestablishing a PET image having time information, and thus an image can be reestablished with incomplete data. Again, attenuation data and emission data can be acquired simultaneously in the PET system having the time information, to shorten a scanning time period, and reduce complexity of a hardware system. Also, multiple mice can be imaged respectively at the same time in the system, and aliasing is prevented.

In order to improve the time resolution of the system, there are three normal methods, that is, a method a, a method b and a method c. The method a is to select a crystal having fast attenuation. The method b is to select a photon multiplier tube having small transit time spread and high quantum efficiency. The method c is to optimize a time label method. The method a and the method b are given, the method c is a concerned issue in the art.

A leading edge discrimination (abbreviated as LED) is used as a simplest time label method for acquiring time of arrival of a pulse in a PET data acquiring system. A reference voltage is set, and time when a voltage amplitude of a pulse exceeds the reference voltage represents time of arrival of a signal event. The method is widely used in a case that a rising edge of a processing pulse is steep and a change in the amplitude is small since the method is easy to be implemented and time jitter caused by noise is small. The method has disadvantages that time walk occurs since the method is vulnerable to the amplitude of the pulse and the rise and fall of a slope of the rising edge, thereby reducing accuracy of the time label.

In order to eliminate the time walk due to the amplitude of the pulse, a constant fraction discrimination (abbreviated as CFD below) is set forth, in which, a scintillation pulse includes two signals. One signal is attenuated and reversed at an attenuation terminal of the CFD, and the other signal is delayed for a constant time period at a delay terminal of the CFD. The delayed signal and the attenuated and reversed signal are added to generate a bipolar signal, and a zero-crossing point of the bipolar signal is detected by a zero-crossing discrimination in the CFD. A time instant of the zero-crossing point is time of arrival of a time label event of the CFD. The delay time period and an attenuating proportion in the CFD are preferred, a timing error caused by the amplitude of the pulse and rising time fluctuation is eliminated by the CFD, and therefore good time performance can be obtained for the PET data acquiring system.

Whether the LED method or the CFD method is developed based on an analog circuit in a conventional time acquiring system. Performance parameters of the analog circuit drift with a change in time, a temperature and an operating environment, and it is difficult to maintain the analog circuit in a state of high performance in an actual system. Specifically, it is a huge challenge to correct the performance parameters for a system such as the PET having thousands of detection channels.

With the rapid development of digital technology the digital leading edge discrimination (abbreviated as DLED below) and the digital constant fraction discrimination (abbreviated as DCFD below) have gradually become an important time label method. The two digital time label methods can be flexibly implemented in a digital device such as a field programmable logic array (abbreviated as FPGA below), a digital signal processor (abbreviated as DSP below). However, their performances are limited by a sampling ratio of an analog-to-digital convertor (abbreviated as ADC below) to a great extent, since an existing PET detector is inclined to select a scintillation crystal having a small attenuation time constant and an photon multiplier tube (abbreviated as PML below) having a fast rising time period to acquire good time performance and counting ratio performance. Taking a mainstream scintillation detector such as LSO/PMT as an example, a rising time period of a scintillation pulse signal outputted from the scintillation detector is normally in a range from 1 ns to 20 ns, and duration of the pulse is 200 ns. In order to achieve time performance the same as or similar to that of the CFD method in a case that time of arrival of the pulse is acquired by the DCFD method and no filtering processing is performed on the scintillation pulse, a sampling ratio of the ADC used in the DCFD method is at least up to 1 Giga samples per second (abbreviated as GSPS below). However, it is no doubt that the high sampling ratio of the ADC brings up troubles of high cost, ultra-high data throughout and ultra-high data processing for the PET. Similarly, a digital pulse time extraction method based on the ADC sampling, such as the mean PMT pulse model (abbreviated as MPPM below), the maximum rise interpolation (abbreviated as MRI) and the initial rise interpolation (abbreviated as IRI below) may also get into a conflict between a high sampling ratio requirement and a high time resolution performance.

Therefore, with regard to the technical problems described above, it is necessary to provide a new time label combination method and system for data volume which can be acquired, to overcome the disadvantages described above.

SUMMARY

In view of this, an objective of the present disclosure is to provide a time label combination method and a time label combination system, to effectively combine multiple original time labels or original event shape fluctuation properties, explore a component associated with time information in digital quantity which can be measured, and improve resolution of the time labels.

In order to achieve the objective described above, the present disclosure provides technical solutions below.

A time label combination method is provided, which includes:

S1, collecting a digital quantity measurement value of a data acquisition system, and establishing a database for the measurement value;

S2, recognizing atomic time label quantities and shape fluctuation statistics;

S3, estimating a covariance matrix of the atomic time labels; and

S4, giving a time label combination according to the least square criterion.

Preferably, in the time label combination method described above, the time label combination is a combination of multiple atomic time labels and event shape fluctuation properties.

Preferably, in the time label combination method described above, a sum of weighting factors of all atomic time labels in the time label combination is equal to 1.

Preferably, in the time label combination method described above, weighting factors of the event shape fluctuation properties are any real number not equal to 0.

Preferably, in the time label combination method described above, the weighting factors of the atomic time labels and the weighting factors of the event shape fluctuation properties constitute a set of all parameters of the time label combination.

Preferably, in the time label combination method described above, a point source having low activity is used as a standard for establishing the database in step S1.

A time label combination system is provided, which includes: a low-dose pre-acquisition data module, a digital quantity recognition module, a digital quantity variance calculation module and a time label combination parameter calculation module, where the low-dose pre-acquisition data module is configured to store a pre-acquired digital quantity having a low counting ratio;

the digital quantity recognition module is configured to recognize whether the pre-acquired digital quantity outputted from the low-dose preset-acquisition data module is an atomic time label or an event shape fluctuation property;

the digital quantity variance calculation module is configured to calculate a covariance matrix of the atomic time label and determine a parameter of a time label combination; and the time label combination parameter calculation module is configured to test and operate the acquired parameter of the time label combination.

As can be seen from the technical solutions described above, the time label combination method and the time label combination system according to the present disclosure can effectively improve time resolution of the system, and are particularly suitable for time acquisition of a digital nuclear instrument.

Compared with the conventional technology, the present disclosure has advantageous effects as follows:

(1) good time resolution, that is, the quality of an image outputted in an imaging mode related to the time resolution is raised, and event discrimination accuracy related to the time resolution is raised; and (2) good adaptability for different scintillation detector systems.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description related to the present disclosure only illustrate some embodiments of the present application. For those skilled in the art, other drawings may be obtained according to these drawings without any creative work.

DETAILED DESCRIPTION OF THE EMBODIMENTS

A time label combination method and a time label combination system are provided in the present disclosure, which can effectively label time of arrive of an event, and improve time resolution of a module and the system.

Technical solutions according to embodiments of the present disclosure are described in detail hereinafter in conjunction with drawings in the embodiments of the present disclosure. Apparently, the described embodiments are only some of rather than all of the embodiments of the present disclosure. Any other embodiments obtained by those skilled in the art based on the embodiments of the present disclosure without any creative work fall into the scope of protection of the present disclosure.

Figure 1:
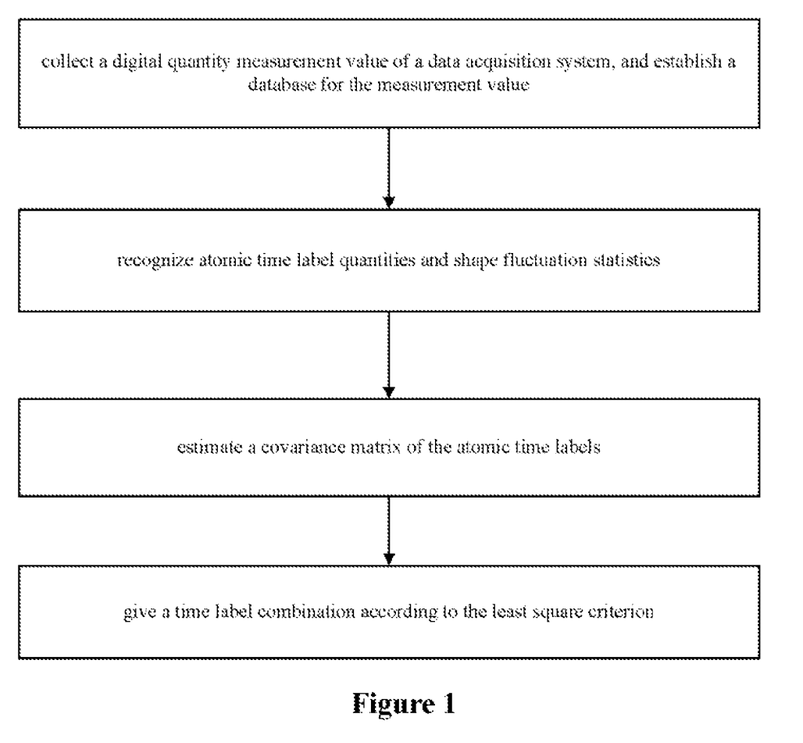
FIG. 1 is a flow diagram of a time label combination method according to the present disclosure.

As shown in FIG. 1, in a time label combination method disclosed in the present disclosure, a database is established by a digital quantity collected, the established database is used to train and test a combination way of atomic time labels. The method includes:

S1, collecting a digital quantity measurement value of a data acquisition system, and establishing a database for the measurement value;

S2, recognizing atomic time label quantities and shape fluctuation statistics;

S3, estimating a covariance matrix of the atomic time labels;

S4, giving a time label combination according to the least square criterion.

In step S1, a point source having low activity is used as a standard for establishing the database. A parameterized time label is trained by a system digital quantity generated by the point source having low activity, to output various parameters of the time label via training. A different sample is used in testing or using the time label.

In step S1, the data acquisition system may be a readout system including a preamplifier, a pulse shaping circuit and an equidistant analog-digital converter, may also be a system (for example, multi-voltage threshold readout system) in which pre-amplification and shaping is read by multiple comparators.

In step S1, for the established database, generally types of the properties of the pulse are greater than or equal to 2, and the number of samples is greater than 1000.

In step S2, the atomic time label quantities and the shape fluctuation statistics are recognized by comparing the atomic time label quantities and the shape fluctuation statistics with a true value. In the process of training, the true value of the time label is calculated based on a position of an emission source. The true value is used as a standard for the training.

In step S2, in a case that a derivative of an expected value of a property with respect to the position of the emission source is equal to 2/c, the property (or pulse characteristic) is the atomic time label quantity. In a case that a derivative of an expected value of a property with respect to the position of the emission source is equal to zero, the property is the shape fluctuation statistics. In a case that a derivative of an expected value of a property with respect to the position of the emission source is not equal to zero and is not equal to 1, the property is a combination of the shape fluctuation statistics and the atomic time label. Both the shape fluctuation statistics and the atomic time label are provided to S3, which are a part of the time label combination, and are also a property of the pulse. The property of the pulse includes an atomic time label property and a shape fluctuation property.

In step S3, the covariance matrix includes associations between various properties. In a case that the atomic time label and the shape fluctuation are selected, the associations become prior knowledge for determining weights of the atomic time label and the shape fluctuation in the combination. The covariance matrix is used in the least square criterion in S4.

In step S4, the time label combination is a combination of multiple atomic time labels and the event shape fluctuation properties.

In step S4, a sum of weighting factors of all atomic time labels in the time label combination is equal to 1, which is used as a constraint condition. The lease square is used as an objective in a case that the constraint condition is met, to search a solution. The solution includes all parameters of the time label.

A weighting factor of the event shape fluctuation property is any real number not equal to zero.

The weighting factor of the atomic time label and the weighting factor of the event shape fluctuation property constitute a set of all parameters of the time label combination. Weighting factors of the time label combination are selected according to the least square criterion or other objective functions including a least square item, for example, L1 norm or other norm is added onto L2 norm with an error, which all fall within the protection scope.

Figure 2:
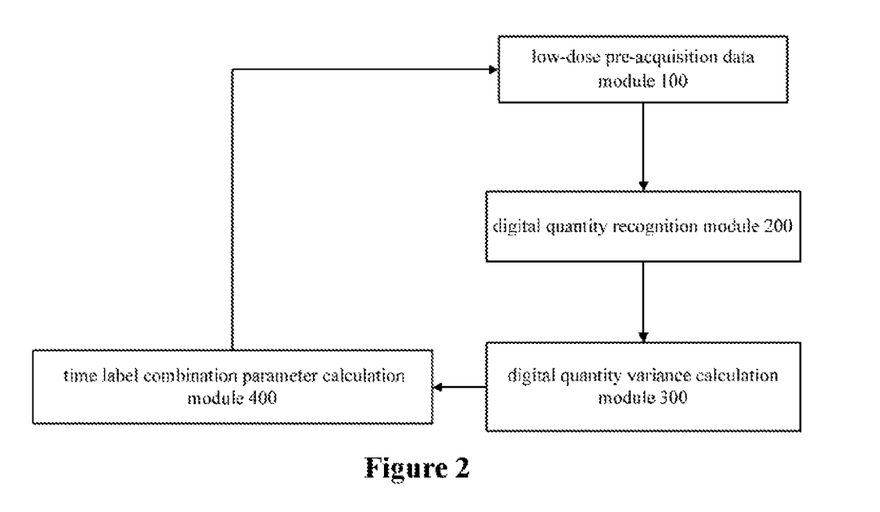
FIG. 2 is a structural diagram of a time label combination system according to the present disclosure.

As shown in FIG. 2, a time label combination system is disclosed in the present disclosure, which includes a low-dose pre-acquisition data module 100, a digital quantity recognition module 200, a digital quantity variance calculation module 300 and a time label combination parameter calculation module 400.

The low-dose pre-acquisition data module 100 is configured to store a pre-acquired digital quantity having a low counting ratio. The digital quantity having a low counting ratio may be other digital quantity of the time label combination method disclosed or other digital quantity which affects the time label combination method.

The digital quantity recognition module 200 is configured to recognize whether the pre-acquired digital quantity outputted from the low-dose preset-acquisition data module 100 is an atomic time label or an event shape fluctuation property.

The digital quantity variance calculation module 300 is configured to calculate a covariance matrix of the atomic time label and determine a parameter of a time label combination; and The time label combination parameter calculation module 400 is configured to test and operate the acquired parameter of the time label combination.

As shown in FIG. 3 to FIG. 10, the present disclosure is further understood in conjunction with FIG. 3 to FIG. 10.

Figure 3:
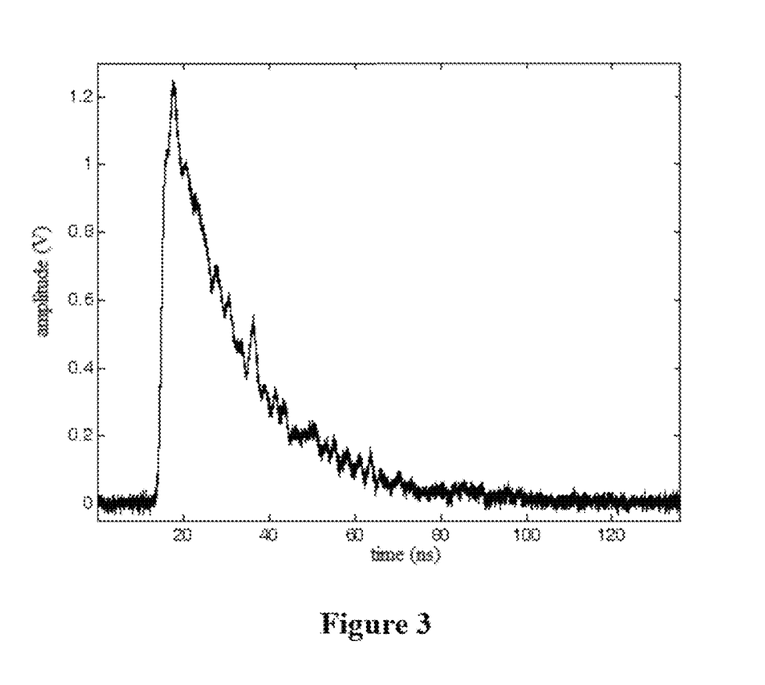
FIG. 3 is a scintillation pulse sample according to the present disclosure.

FIG. 3 is a scintillation pulse sample according to the present disclosure, a rising time period of the pulse is approximately 0.7 ns, a time constant (a time period during which the pulse is attenuated to 1/e) of a falling edge of the pulse is approximately 22 ns, and the pulse is an electrical pulse outputted from R9800 and is collected by a high-speed oscillograph DPO71604.

Figure 4:
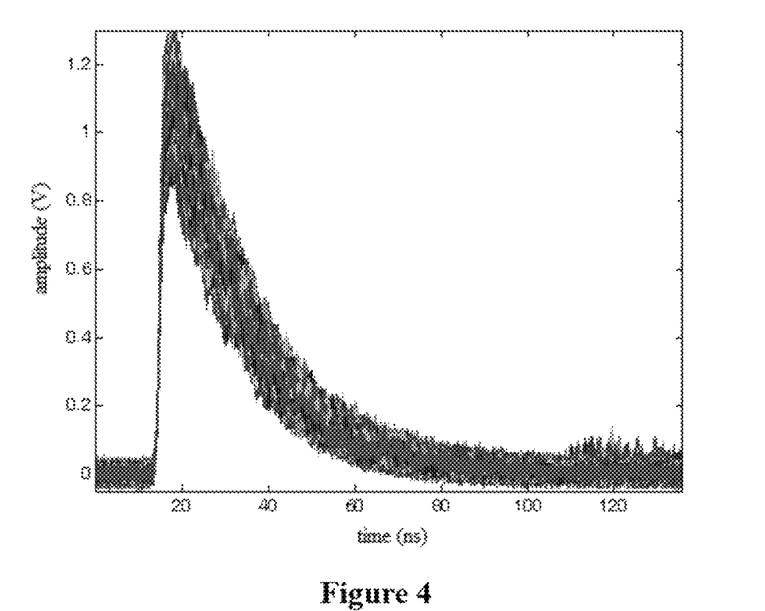
FIG. 4 is scintillation pulse data after alignment operation in a database according to the present disclosure.

FIG. 4 is a scintillation pulse data after alignment operation in a database according to the present disclosure. The pulses are drawn in a timeline after the time of arrival of the pulses is aligned. A main noise type of the scintillation pulse can be deduced from an envelope line of the data.

Figure 5:
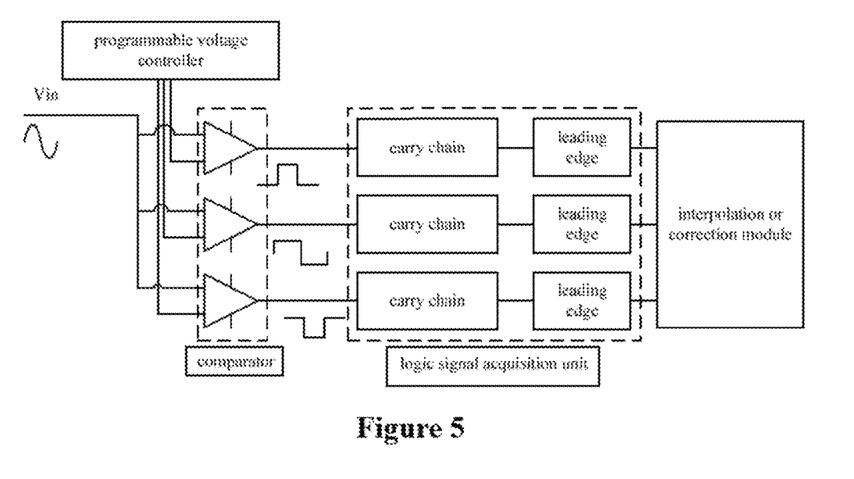
FIG. 5 is a schematic diagram of a multi-leading-edge time label discrimination method according to an embodiment of the present disclosure.

FIG. 5 is a schematic diagram of a multi-leading-edge time label discrimination method according to an embodiment of the present disclosure. The multi-leading-edge time label discrimination method is an example of multi-threshold time discrimination, for which only the rising edge which changes fast is considered and an influence of the falling edge on the time performance is ignored for an encoding part. The label discrimination method is shown in FIG. 5, which includes a comparator array, a logic signal acquisition unit and an interpolation or correction module.

Figure 6:
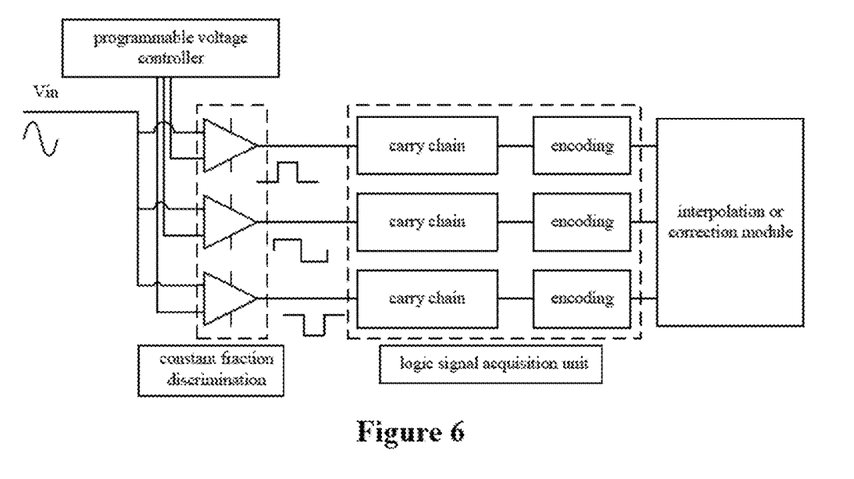
FIG. 6 is a schematic diagram of a multi-convolution/ leading-edge time label discrimination method according to an embodiment of the present disclosure.

FIG. 6 is a schematic diagram of a multi-convolution/leading-edge time label discrimination method according to an embodiment of the present disclosure. The multi-convolution/leading-edge time label discrimination method is achieved by adding an analog convolution module before the leading-edge discrimination, for which only the rising edge which changes fast is considered and an influence of the falling edge on the time performance is ignored for an encoding part. The analog convolution module may be composed of resistance-capacitance circuits, or may be achieved with a differential line and a subtraction circuit. A typical method of the multi-convolution/leading-edge time label discrimination is shown in FIG. 6, which includes a CFD array, a logic signal acquisition unit and an interpolation or correction module.

Figure 7:
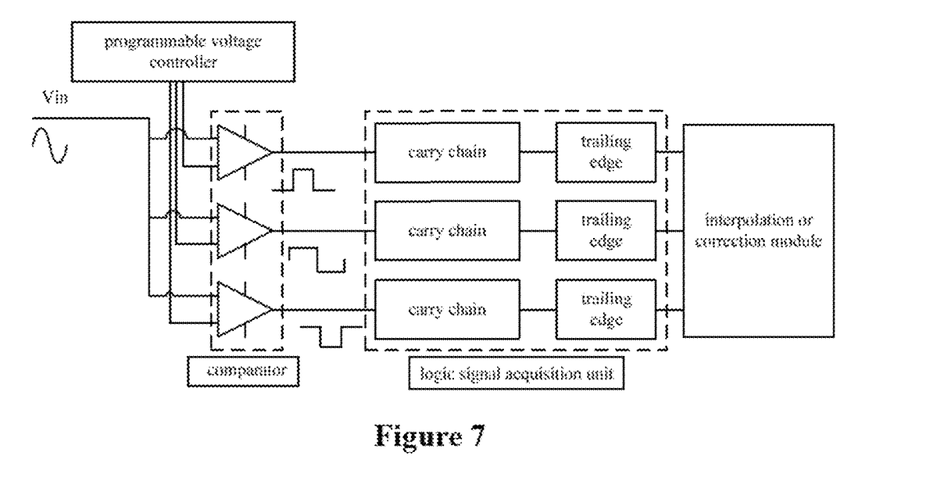
FIG. 7 is a schematic diagram of a leading-edge and trailing-edge time label discrimination method according to an embodiment of the present disclosure.

FIG. 7 is a schematic diagram of a multiple leading-edge and trailing-edge time label discrimination method according to an embodiment of the present disclosure. The multiple leading-edge and trailing-edge time label discrimination method is an example of the multi-threshold time discrimination, for which not only the rising edge which changes fast is considered, but also an influence of the falling edge on the time performance is considered for an encoding part. The method of the multiple leading-edge and trailing-edge time label discrimination is shown in FIG. 7, which includes a comparator array, a logic signal acquisition unit and an interpolation or correction module.

Figure 8:
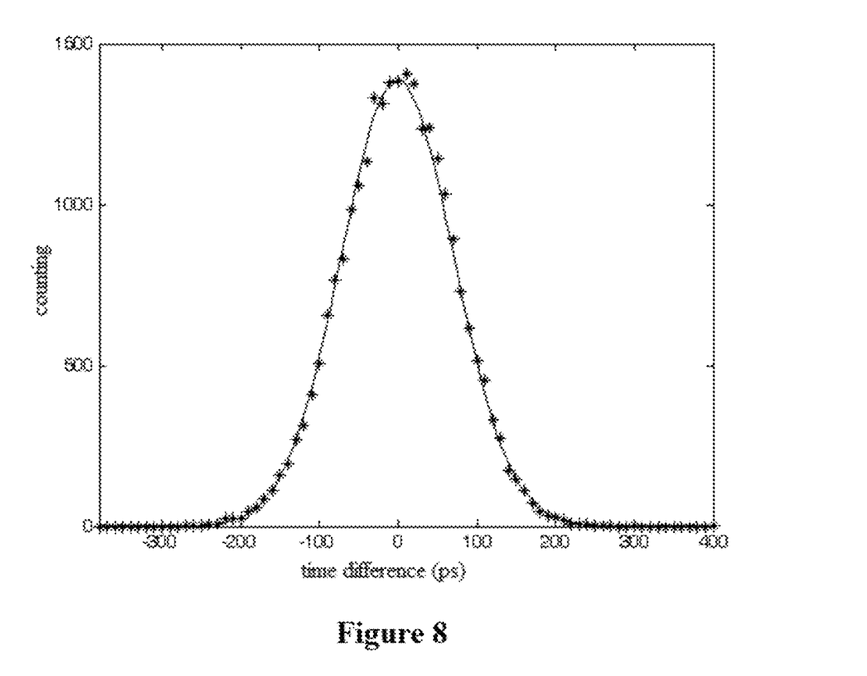
FIG. 8 is a time difference spectrum of leading-edge discrimination according to an embodiment of the present disclosure.

FIG. 8 is a time difference spectrum of multi-leading-edge discrimination according to an embodiment of the present disclosure, and the time difference spectrum is given by a method in FIG. 5.

Figure 9:
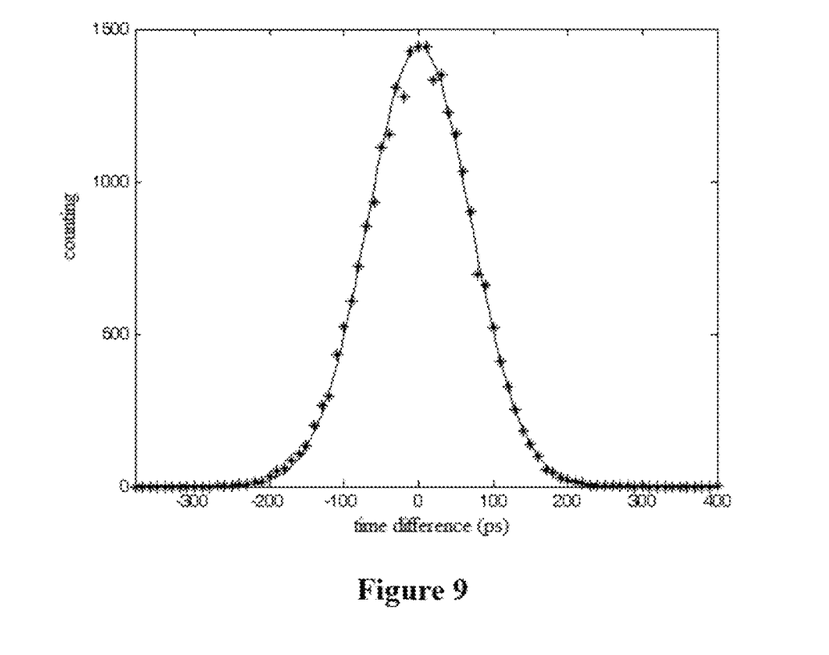
FIG. 9 is a time difference spectrum of multi-convolution/ leading-edge discrimination according to an embodiment of the present disclosure.

FIG. 9 is a time difference spectrum of multi-convolution/leading-edge discrimination according to an embodiment of the present disclosure, and the time difference spectrum is given by a method in FIG. 6.

Figure 10:
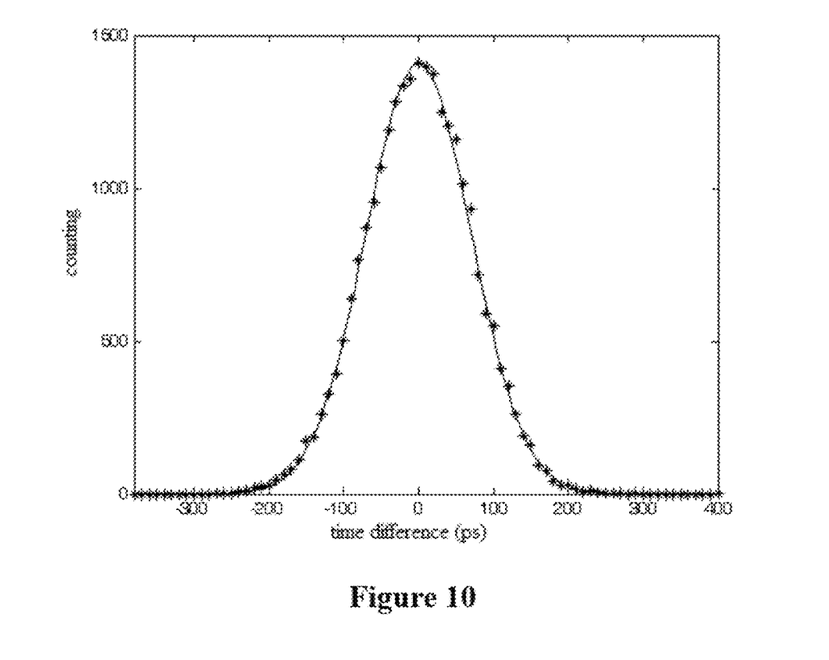
FIG. 10 is a time difference spectrum of leading-edge and trailing-edge discrimination according to an embodiment of the present disclosure.

FIG. 10 is a time difference spectrum of a multiple leading-edge and trailing-edge discrimination according to an embodiment of the present disclosure, and the time difference spectrum is given by a method in FIG. 7.

Figure 11:
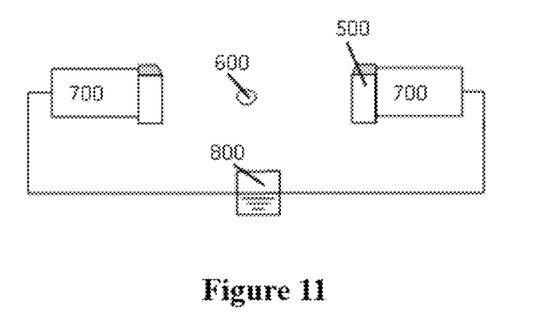
FIG. 11 is a schematic diagram of a typical system according to the present disclosure.
Figure 12:
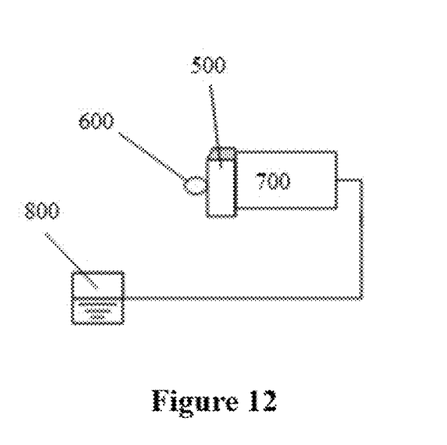
FIG. 12 is a schematic diagram of another typical system according to the present disclosure.

As shown in FIG. 3, FIG. 11 and FIG. 12, FIG. 11 is a schematic diagram of a typical system in an operating mode according to the present disclosure, FIG. 12 is a schematic diagram of a typical system in another single-channel operating mode according to the present disclosure. Specifically, 500 represents a scintillation crystal, 600 represents an emission source, 700 represents a photomultiplier tube, 800 represents a digital oscilloscope. In conjunction with FIG. 3, FIG. 11 and FIG. 12, the time label combination method and the time label combination system according to the disclosure are further described by way of multiple embodiments. In the time label combination method and the time label combination system according to the present disclosure, the related parameters and filter design should be adjusted based on characteristics of acquired data, to achieve good energy resolution performance and short pulse duration. Parameters for processing data in the application embodiments are listed here.

First Embodiment

Parameters for processing data in the first embodiment are listed here.

In an actual system used in step (1), a LaBr crystal and a Hamamassu R9800 PMT are used, and the size of the crystal is 10.0 mm×10.0 mm×10.0 mm. Coupling surfaces between the crystal and the PMT include 100 surfaces, surfaces other than the coupling surfaces are packaged by metal. The data acquisition system has a sampling ratio of 50 Ghz and a bandwidth of 16 Ghz. The emission source is a positron annihilation gamma photon of 511 kev. A coincident time is approximately 2 ns, and an energy window is approximately in a range from 400 keV to 600 keV.

Leading-edge discrimination of multiple voltage threshold parameters is used as an atomic label in step (2).

In step (3), one atomic time label is added every time, the time label added every time increases the time resolution at best. In a case that the increased time resolution is greater than 1 ps, no additional LED leading-edge threshold is increased.

In testing and using in step (4), parameters of the time label combination obtained in step (3) are used.

Second Embodiment

Parameters for processing data in the second embodiment are listed here.

In an actual system used in step (1), a LaBr crystal and a Hamamassu R9800 PMT are used, and the size of the crystal is 10.0 mm×10.0 mm×10.0 mm. Coupling surfaces between the crystal and the PMT include 100 surfaces, surfaces other than the coupling surfaces are packaged by metal. The data acquisition system has a sampling ratio of 50 Ghz and a bandwidth of 16 Ghz. The emission source is a positron annihilation gamma photon of 511 kev. A coincident time is approximately 2 ns, and an energy window is approximately in a range from 400 keV to 600 keV.

Four fixed CFD digital quantities and four fixed EN-LED digital quantities are used in step (2).

In testing and using in step (4), parameters of the time label combination obtained in step (3) are used.

Third Embodiment

Parameters for processing data in the third embodiment are listed here.

In an actual system used in step (1), a LaBr crystal and a Hamamassu R9800 PMT are used, and the size of the crystal is 10.0 mm×10.0 mm×10.0 mm. Coupling surfaces between the crystal and the PMT include 100 surfaces, surfaces other than the coupling surfaces are packaged by metal. The data acquisition system has a sampling ratio of 50 Ghz and a bandwidth of 16 Ghz. The emission source is a positron annihilation gamma photon of 511 kev. A coincident time is approximately 2 ns, and an energy window is approximately in a range from 400 keV to 600 keV.

Four fixed leading-edge over-threshold time digital quantities and four fixed trailing-edge over-threshold time digital quantities are used in step (2).

In testing and using in step (4), parameters of the time label combination obtained in step (3) are used.

The method and the system according to the present disclosure can be applied to nuclear detection, nuclear analysis and a nuclear medicine instrument with a high counting ratio.

In the time label combination method according to the present disclosure, a time label parameter combination of an event pulse is acquired by a point source having low activity. Measurable data quantities are provided from low-dose point source data, and the data quantities are stored into a database. The database of the digital quantities reflects coupling relations between various basic time labels and event shape fluctuation properties. An optimization equation is solved with addition constrain based on an objective function of the least square criterion. A variable to be optimized in the optimization equation is a parameter of the time label combination.

With the time label combination method and the time label combination system disclosed in the present disclosure, the time resolution can be improved, and the image quality is improved by introducing time information in reconstruction, so that detection geometry for incomplete data which can not be achieved in a conventional PET can be reconstructed accurately, and a positron annihilation lifetime spectrometer outputs a lifetime spectroscopy having a wider bandwidth, and can detect some short lifetime physical processes. In an attenuation and correction process, good enough time of flight (abbreviated as TOF) information is introduced, and thus the attenuation coefficient may be taken as a constant. In some detection devices in which double coincidence, anticoincidence and multiple coincidences are used, a particle counting ratio detected can be increased and a spread of likelihood function in list data can be reduced in the same coincident ratio. In addition, multiple new applications such as dynamic PET scanning, attenuation data and the emission data simultaneous acquisition become possible since the time resolution becomes good.

The time label combination method and the time label combination system according to the present disclosure improves the time resolution of the system effectively, and are suitable for time acquisition of a digital nuclear instrument.

Compared with the conventional technology, the present disclosure has advantageous effects as follows:

(1) good time resolution, that is, the quality of an image outputted in an imaging mode related to the time resolution is raised, and event discrimination accuracy related to the time resolution is raised; and (2) good adaptability for different scintillation detector systems.

It is apparent for those skilled in the art that the present disclosure is not limited to details of the exemplary embodiments described above, and can be implemented in other embodiments without departing from spirit or basic features of the present disclosure. The embodiments are considered in all respects to be exemplary and non-restrictive. The scope of the present disclosure is limited by the appended claims rather than specification described above, all changes within meaning and scope of equivalent elements of the claims are included in the present disclosure. Any reference number in the claims is not considered to limit the claims related to the reference number.

In addition, it should be understood that, although the present disclosure is described based on the embodiments, not every embodiment includes only one separate technical solution, the description way in the specification is just for the sake of clarity those skilled in the art should regard the specification as a whole, the technical solution of each of the embodiments may also be combined to form other embodiments which can be understood by those skilled in the art.

The invention claimed is:

1. A time label combination method, comprising:
    S1, collecting a digital quantity measurement value of a data acquisition system, and establishing a database for the measurement value;
    S2, recognizing atomic time label quantities and shape fluctuation statistics;
    S3, estimating a covariance matrix of the atomic time labels; and
    S4, giving a time label combination according to a least square criterion,
    wherein a point source having low activity is used as a standard for establishing the database in step S1.

2. The time label combination method according to claim 1, wherein the time label combination is a combination of multiple atomic time labels and event shape fluctuation properties.

3. The time label combination method according to claim 1, wherein a sum of weighting factors of all atomic time labels in the time label combination is equal to 1.

4. The time label combination method according to claim 1, wherein weighting factors of the event shape fluctuation properties are any real number not equal to 0.

5. The time label combination method according to claim 1, wherein weighting factors of the atomic time labels and weighting factors of the event shape fluctuation properties constitute a set of all parameters of the time label combination.

6. A time label combination system, comprising: a low-dose pre-acquisition data module, a digital quantity recognition module, a digital quantity variance calculation module and a time label combination parameter calculation module, wherein
    the low-dose pre-acquisition data module is configured to store a pre-acquired digital quantity having a low counting ratio and establish a database for the digital quantity;
    the digital quantity recognition module is configured to recognize whether the pre-acquired digital quantity outputted from the low-dose preset-acquisition data module is an atomic time label or an event shape fluctuation property;
    the digital quantity variance calculation module is configured to calculate a covariance matrix of the atomic time label and determine a parameter of a time label combination; and
    the time label combination parameter calculation module is configured to test and operate the acquired parameter of the time label combination;
    wherein a point source having low activity is used as a standard for establishing the database.

* * * * *